Dec. 2, 1958 H. K. BAUMEISTER 2,862,781

RECORDING SUPPORT DEVICES

Filed Jan. 27, 1954 2 Sheets-Sheet 1

INVENTOR.
HEARD K. BAUMEISTER
BY
J W Armbruster
ATTORNEY

INVENTOR.
HEARD K. BAUMEISTER
BY
J W Armbruster
ATTORNEY

United States Patent Office 2,862,781

Patented Dec. 2, 1958

2,862,781

RECORDING SUPPORT DEVICES

Heard K. Baumeister, New York, N. Y., assignor to International Business Machines Corporation, New York, N. Y., a corporation of New York Application January 27, 1954, Serial No. 406,448

9 Claims. (Cl. 346—74)

This invention relates generally to a novel supporting device and more particularly to a spring loaded and air supported shoe for poising a magnetic head above a rapidly rotating magnetic drum.

Heretofore, the cost of making a magnetic drum and cooperating recording, reading and erasing heads was high due to the requirements that the drum be concentric, smooth and truly cylindrical within close limits. Since the fixed heads were mounted close to the drum surface without touching the same, and since the uniformity of the magnetic effects imparted to or derived from the drum depended upon the maintenance of close limits of spacing between fixed heads and all positions of the surface of the drum when rotated, the whole assembly was expensive. In order to maintain accuracy it was necessary to mount the drum on a rather heavy rigid shaft and make the drum rather thick so that it remained truly cylindrical even when rotated at high speed. The surface of the drum had to be accurately machined and plating or coatings thereon had to be of uniform thickness. Then there was also the need to mount the heads accurately or adjustably with respect to the surface of the drum.

Ordinarily the requirements for the minute clearance between the surface of a magnetic drum and the normal fixed head are rather difficult to fill. Not only must the head be very close to the drum, but this distance must not vary much. In order to have the time average clearance as small as possible, a radial adjustment of the head is often provided. In order to keep the variation small there are used either devices for radial adjustment of the drum on its bearings or expensive accurate manufacturing techniques. In either case, the bearings must be of an expensive variety with regard to surface geometry and exhibit almost no deflections under load caused by imbalance at high speeds even though the drum may be centered properly.

The present invention involves a simple means to obtain and maintain a smaller and more constant head to surface spacing by the use of a spring loaded, air supported, magnetic drum shoe and head. The force due to the pressure in the wedge of air between the shoe and drum caused by the relative motion of the bounding surfaces and the viscosity of air, keeps the shoe and head off the drum and is resisted by the force of the spring that tends to put the shoe in contact with the drum. Any imbalance in these two opposing forces caused by surface irregularity and the tendency to vary the thickness of the wedge of air by a raised or a lowered surface merely accelerates the shoe and head in the direction that restores them to the balanced position. The head may be made light enough to be easily accelerated by the forces generated by the eccentricities of the drum.

Because of the action of the air in cooperation with the deflecting shoe, dust and dirt will not be permitted to accumulate in the spacing between the head and the drum as it has in prior art constructions; instead it will be blown clear to preserve the clean air gap desired.

Now, because of the inexpensive but effective way in which a natural air disturbance is used by the devices of the present invention, it is possible to lighten and cheapen many of the parts of magnetic drum equipment. As a drum rotates, the surrounding air is disturbed so that it tends to follow the direction of surface motion and also move outward. Therefore, when a magnetic head is pivoted as taught here and provided with an air shoe, rider or float so shaped as to catch, pocket and confine the disturbed air rising from the moving drum surface, then the head may be so supported by such air and poised above the drum surface as to ride up and down uniformly over irregularities or eccentricities of the drum surface. Since the improved construction is adapted to automatically compensate for lighter and less accurate construction it is possible to use lighter and less expensive construction. It is also possible to attain drum speeds as high or higher than usual with less expenditure of energy because of the lighter construction.

The air rider or shoe is curved and placed to form an acute angle with the drum in the direction of surface motion. Near the midpoint of the shoe is where it is pivoted on the loading structure such as a leaf spring and at the end opposite the end of air entry there is mounted the magnetic head poised near but not touching the drum. As the drum rotates and drives air under the shoe to form an air column between the drum surface and the underside of the shoe, the pressure exerted by this column fluctuates as the drum surface either protrudes or recedes irregularly or eccentrically. There is automatically created an extra amount of lift or reduced support wherever needed to raise or lower the head but still maintain the desired spacing of the head from the drum surface at all drum positions despite irregularities. A spring or weight is provided to apply an adjustable amount of pressure on the shoe to counteract the air pressure and provide regulation for different drum speeds, different weights of heads, different desired head spacings, etc. The head and shoe extension are of low inertia characteristics in order to more readily follow the drum irregularities despite the frequency of their occurrence at high speed.

An object of the invention is the provision of devices for using the disturbance of a fluid medium for poising an element above the movable object which causes said disturbance.

Another object of the invention is the provision of devices for making air borne a stylus or head or similar instrumentality over a moving record in such a way as to compensate automatically for the irregularities of the surface of the record.

A feature of the invention is the design of a magnetic head with an extending portion in the shape of a shoe riding closely over the surface of an associated drum to make the head air borne on an air film, said film being compressed and created solely by relative movement of the immediate drum and shoe surfaces and not brought in from extraneous compression means.

Another object of the invention is the provision of improved magnetic sensing means including an air rider, float, vane or shoe which is so connected to a magnetic head as to catch, cup or divert the air between said shoe and a rotating magnetic drum and by means of the air pressure between said shoe and drum keep said head elevated, poised or suspended uniformly with the end of said head a short distance away from said drum and so maintained despite irregularities of radius or eccentricities of the drum. By providing a pivotal suspension for the head and imposing an adjustable tension in opposition to the cushioning air pressure, it is possible to regulate the spacing of the head to take care of desired drum speeds, required spacing for magnetic recording, sensing and erasing, etc.

A feature of the invention is the provision of automatic retracting means for lifting and holding a stylus or head normally separated from a cooperating moving body and only releasing said head when the body speed is sufficient to provide an air support column such as to hold the head away from the body.

An object of the invention is the provision of an improved pivotal support for a magnetic head. The novel form of support provides for motion about two centers or centerlines; an axis near the periphery of the drum and parallel therewith, and a second axis more remote and across a line at a tangent to the periphery of the drum. The more remote axis is the attaching location for a leaf spring the free end of which is fastened to the pivot of the head support. Accordingly the head may be rocked about the support pivot as well as swung outward from the drum about the attached end of the spring. The air disturbance caused by the rapid rotation of the drum not only acts against the underside of the support which is in the shape of a shoe, but it also causes the leaf spring to flex outward to carry the head away from the drum.

An object is to provide a form of flexible head suspension to permit rapid correction of head position in all three planes. By the use of three support pivots on one form of shoe, the head thereon is made responsive toward tilted and tipped positions in any direction required to follow the drum surface. By bifurcation of the loading leaf spring in another type of support there is again complete flexibility of the shoe pivoted on the separated ends of the spring, said leaf ends being independently flexed for tilting the shoe. In both instances the support is flexible enough to follow axial drum irregularities as well as peripheral variations.

Another object of the invention is to provide a magnetic head poising assembly including a shoe for extending the formation of the head far enough around a rapidly revolving drum to form a rider or float on the air film created by the drum, said shoe being light enough and of low inertia so that it may respond instantaneously to drum contour changes and maintain the poise of the head accordingly, said assembly also including a loading weight or spring which presses the shoe on the air film firmly to insure constant spacing of minute proportions between the head and drum surfaces, said pressure being firm enough to prevent bouncing and yet light enough to prevent rupture of the air film and contact between head and drum.

Another object of the invention is the provision of an air pressure rider or shoe which is secured to a magnetic head and is so shaped as to have an effective air floating curve which is formed at a radius slightly larger than the radius of the periphery of the magnetic drum with which the head cooperates.

Other objects of the invention will be pointed out in the following description and claims and illustrated in the accompanying drawings, which disclose, by way of example, the principle of the invention and the best mode, which has been contemplated, of applying that principle.

Figure 1:
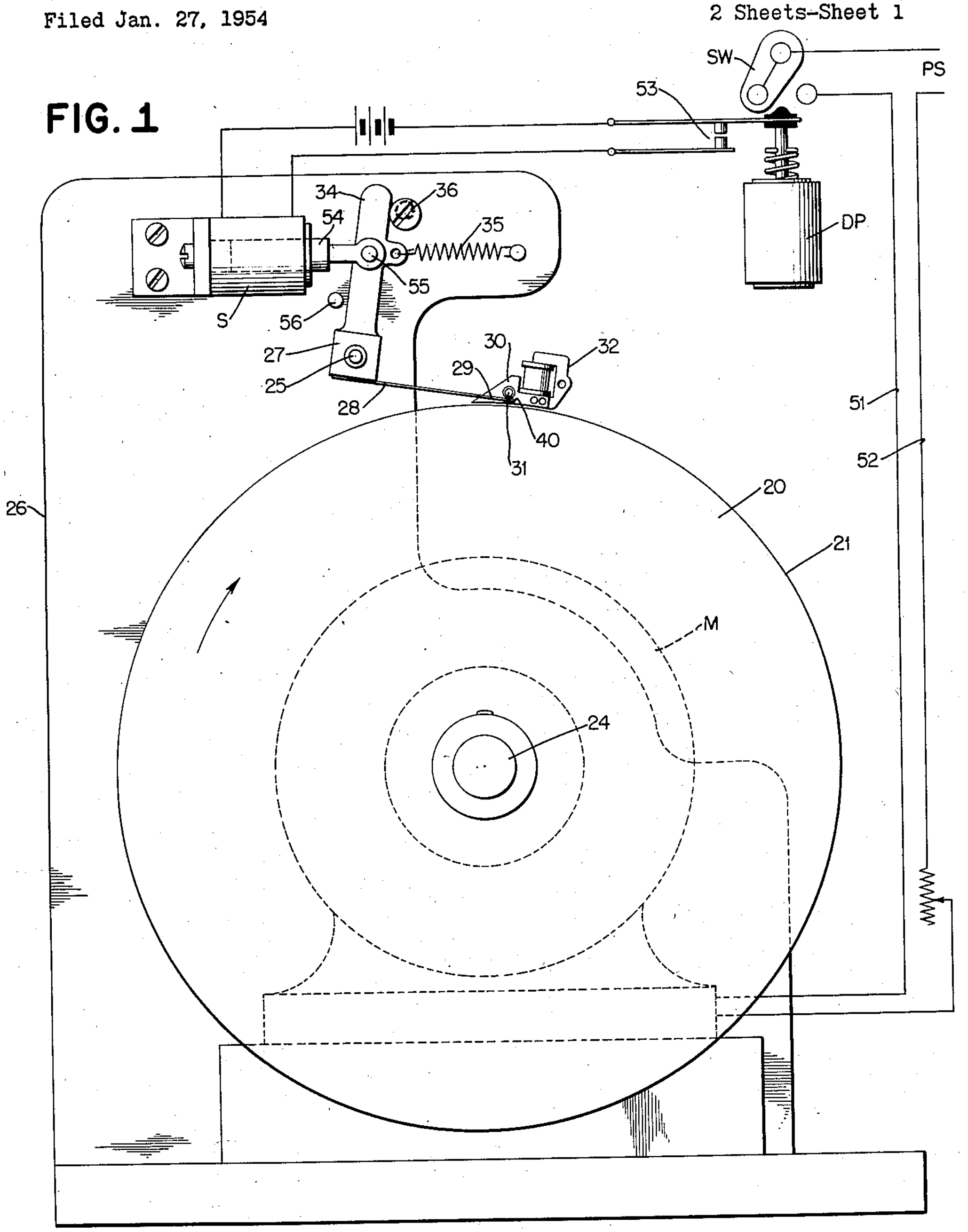
Fig. 1 is an elevation view showing the invention as applied to a magnetic drum and a sensing or recording head cooperating therewith and held poised over said drum by air pressure on the underside of an air borne shoe which is fastened to the head and both pivotally mounted above the surface of the drum so as to float on the compressed air film carried along with the rapidly rotating drum.

The magnetic drum 20, Fig. 1, is formed with a paramagnetic or magnetizeable periphery 21 which is susceptible to the recording thereon of data representing indicia in the form of magnetized spots or lines which are distinct discrete manifestations. In order to drive the drum clockwise at high speed there is provided a motor M connected thereto through the drum shaft 24.

Figures 2, 3:
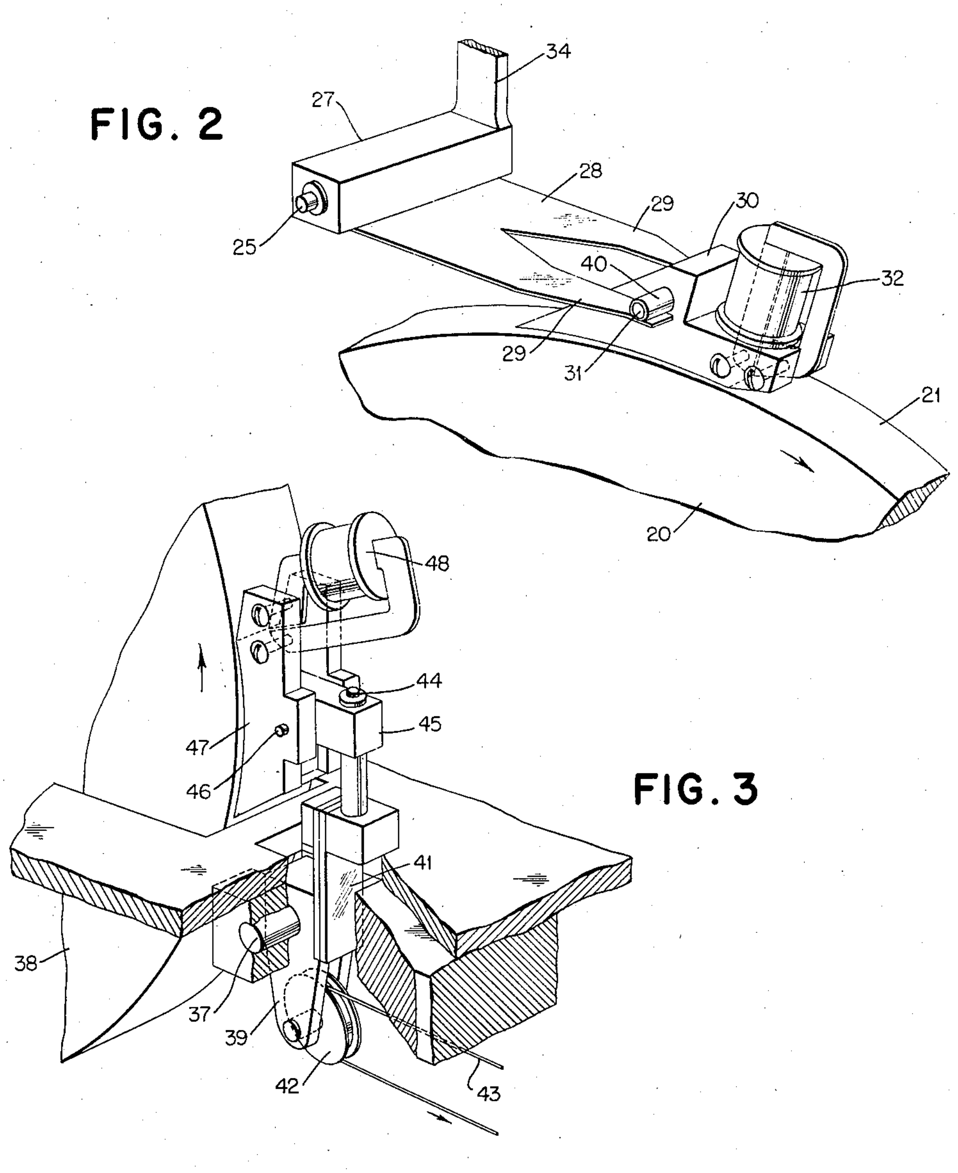
Fig. 2 is a detailed perspective view of the spring loaded shoe and head shown in Fig. 1.
Fig. 3 is a perspective view of another form of shoe with universal joint pivots; it is a form of gimbals or ball joint.

Pivotally mounted on a stud 25 extending from the side frame 26 is a mounting bar 27 to the underside of which is fastened a leaf spring 28 which extends towards the drum periphery in a direction generally tangent thereto. The free end of spring 28, Fig. 2, is bifurcated and the two separate extensions 29 span across a curved shoe, float or air vane 30 which is formed on the underside with a curved air foil or pocket which is of a radius slightly larger than that of the drum. Extending from the sides of shoe 30 is a pair of trunnions 31 which are encircled by pieces of tubing 40 fastened to the spring extension ends 29 by soldering or other connecting means. The shoe 30 is normally poised or suspended as shown in Fig. 2 when the drum is rotating. Then the shoe is elevated slightly above the drum with the lower shoe area riding on air and acting as an air float with the right end tipped closer to the drum so that the whole shoe forms an acute angle or tapered confinement space for air which is brought in under the shoe by the rapidly rotating drum and in escaping from under the shoe, presses upwardly and outwardly against the underside of the shoe constantly to raise the shoe and hold it poised above the drum uniformly spaced regardless of the occasional eccentricity or other irregularities of the drum surface.

Turning now to consideration of the main function of the shoe and that is as a means for holding a stylus or magnetic head poised above the drum, it will be noted in Fig. 2 that the right side of the shoe is bifurcated and embraces a head structure 32 which is fastened therein by set screws which clamp the laminated core or yoke of the head against one side of the shoe. Therefore the head 32 is supported in a novel way to be unusually responsive to the slightest change in air pressure on the shoe 30 which change in pressure is in turn caused by the slightest change or difference in contour of the drum as it turns to put different indicia bearing areas under the head.

It will be noted that the shoe 30 and the head 32 thereon is not only subject to rocking motions about trunnions 31 but also subject to outward swinging motion about bar 27 as another axis. This dual flexibility makes the suspended head singularly responsive to the slightest change in the level of the air film as dependent on the underlying surface of the drum so that the head remains at a constant spaced relationship above the drum despite wavy irregularities or eccentricities along the drum surface as it comes under the head.

Since the two leaf spring extensions or arms 29 are individually movable it is obvious that tipping of the shoe and head from side to side is also possible. This sort of side tipping movement serves to compensate for any axial irregularity of the drum, i. e., changes in surface regularity at right angles to the peripheral or circular direction.

If it is desired to provide a more rigid mounting for the leaf spring 28, center 25 may be in the form of a bolt which clamps the bar 27 and fixed spring end fast to the side frame in the position of adjustment found appropriate for the conditions attending a long run of the drum.

The shoe and head of Figs. 1 and 2 are spring loaded to be pressed down on the air film to such an extent as to be firmly adherent to a fixed drum to head spacing and to prevent bouncing, and yet the pressure must not be so great as to overcome the air pressure and allow drum to head contact. There is quite an amount of latitude in the variation of pressure for spring loading as the air film is not easily broken. Extending upwardly from bar 27, Fig. 1, is an arm 34 to which is attached a rather strong coil spring 35 the other end of which is attached to a stud in side frame 26. Cooperating with the right side of arm 34 is the head of an adjustable eccentric screw bolt 36 which may be turned and set to determine the angular position of the arm 34 and bar 27. Spring 35 and adjustment 36 serve to regulate the angularity of leaf spring 28 and that in turn determines the amount of spring loading which leaf spring 28 imposes on shoe 30 as exerted through the trunnions 31. With variable spring loading it is possible to select not only the desired degree of close head to drum spacing, but also to exert the necessary firmness required for selected drum speed, tendency to cause bouncing by a particular drum, or any other variation tending to change the head to drum spacing.

A modification of the head and shoe mounting means is shown in Fig. 3. In this instance there is the use of a sort of universal joint mounting to free the shoe for following an air film in all directions. From the fixed mounting to the shoe there are a series of pivotal connections with the final effect of making the shoe free to tip in any direction and yet remain as a whole suspended firmly above the drum air film and to carry a magnetic head at a constant uniform drum to head spacing despite drum surface irregularities at high speed. The whole mounting means is pivoted at 37 on a side frame and at a tangent to the surface of the drum 38. A lever 39 is pivoted on center 37 and provided with a pulley 42 around which is pulled a wire 43 the upper side of which is fixed and the lower side of which is pulled to the right by means of springs or weights (not shown) to impress a variable form of loading on the shoe. Extending upwardly from lever 39 is a plastic leaf spring 41 and a shaft or pivot 44 upon which is pivotally mounted the sub frame 45. Projecting from the sides of frame 45 are the ends of a shaft 46 upon which is pivotally supported the shoe 47 which has ears encircling the ends of shaft 46 and spanning across the width of frame 45. The lower side of shoe 47 is formed with a recessed curve at a slightly larger radius than the radius of the drum surface to conform with a portion of the drum periphery. A magnetic head 48 is secured to the top end of the shoe.

The style of operation of the shoe mounting shown in Fig. 3 is generally similar to that of Fig. 2. However, it will be noted that the pivots 37, 44 and 46 provide a sort of universal joint which, although it holds the shoe in a positive fashion against the drum film, also frees the shoe for tipping, rocking and swinging action in all directions to follow the air film at different levels and angles as determined by any irregularities of the drum periphery.

It will be noted that compensation of the shoe and head for drum surface distortion is not limited to corrections in one or two planes but is provided for by a sort of universal suspension to permit rapid correction in all three planes. The three pivots, Fig. 3, provide for complete flexibility of movement of the shoe 47 and head 48 so that they not only rise and fall with the contour of the drum to preserve close spacing but they also may tip from side to side or from corner to corner to follow axially directed distortions in the drum surface. As shown in Fig. 2, the straddling form of leaf spring 28 and the pivot tubes 40 thereon provide a more inexpensive form of the same type of flexible mounting as that of Fig. 3.

In order to prevent wear on the shoe, head and drum it is advisable to provide a retracting device for holding the shoe and head away from the drum and withdraw the spring loading thereof during the time that the drum is starting and while it is coming to a stop. It is only a matter of seconds to create or dissipate an air film support and it is over such intervals that a solenoid operated retractor may be employed to raise the entire head assembly.

The retractor is called into action along with and just prior to the making or breaking of a circuit for calling the drum motor M into operation. In Fig. 1 it is seen that a switch arm SW for the circuit lines 51 and 52 for motor M is so situated above contacts 53 that in moving to or from the closed position it depresses the top blade of the contacts to close the contacts. Since a momentary holding of the retraction circuit is desired, the top blade is non-conductively attached to the plunger of a dashpot DP which serves in the usual fashion to delay the rapid separation of contacts 53. As long as the contacts 53 are closed they perfect an energizing circuit for a solenoid S the plunger 54 of which is pivotally connected at 55 to the arm 34 extending upward from the pivoted block 27 which has affixed thereon the left end of the leaf spring 28. The coil spring 35 caught on the side of arm 34 tends to rock the block 27 and leaf spring 28 clockwise to the normal operating position for imposing spring loading on the air cushioned shoe and head, with the degree of loading adjusted by the stop 36 which is the eccentric head of the adjustment screw. However, attendant to a starting or stopping operation the retractor is called into action by the energization of the solenoid S and the plunger 54 thereof is drawn rapidly to the left against the tension of spring 35. This action causes a counterclockwise rocking of arm 34 against the stop 56 and turning of block 27 about pivot 25 and lifting of the shoe and head above the drum. The solenoid circuit is sustained for a predetermined short length of time as controlled by the setting of the recovery of the dashpot DP. When the dashpot recovers, contacts 53 are again opened to deenergize the solenoid S, whereupon spring 35 rocks the assembly clockwise, and at that time it is safe to lower the shoe 30 toward the drum 20 because it is at full speed and creating the air disturbance which results in the film separation of the shoe and head from the drum for the desired minute distance which the leaf spring loading maintains thereafter during high speed operation of the drum and until such time as the switch SW is moved toward the motor circuit opening position, whereupon the solenoid retractor is again activated momentarily.

It was found in the case of a shoe with an effective area of about one square inch when loaded at about two pounds and poised above a six inch drum rotating at about 3500 R. P. M. that the space average distance of head to drum spacing was maintained at about .0005 of an inch. Generally similar proportions held true with smaller shoe spring loaded through a leaf spring and also cooperating with a six inch drum.

It was found possible by use of the devices of the present invention to record and read magnetic indicia successfully when using a magnetic drum which was so out of round and eccentric as to be ordinarily useless. By using the spring loaded, air supported head it was possible to have the heads follow the rise and fall of the drum surface automatically and maintain a small head to drum clearance with substantial spring loading but without overloading the air film to the point that it breaks down and permits shoe or head to drum contact. The pressure caused by the velocity gradient across the wedge of air is opposed by the force of the leaf spring. Any change in the velocity gradient or viscosity causes an imbalance of forces which accelerates the shoe and head in a direction to restore the head to the closely spaced balanced position. All that is required is a strong enough loading spring, a light enough shoe, and a bearing large enough to support the loading and the head will follow drum surface waves, irregularities or eccentricities and permit the use thereof for magnetic sensing and recording control in an improved manner.

A number of air supported heads may be associated with the same drum and mounted rather closely in succession around the periphery. It was found that the air film support is quite localized and does not seem adversely affected by objects along the drum surface fore and aft of the shoe and head of one magnetic unit.

The pressure under the shoe increases towards the back of the shoe and would reach a peak there but for leakage. As a practical matter, the peak is reached at about ⅗ of the way back from the leading edge of the shoe, i. e., the edge at the left in Figs. 1 and 2; and by putting the pivotal connection 31 there with a 6 to 4 spacing along the effective shoe length, there is a balance of moments. It is also advantageous to put the pivotal connection 31 further down near the bottom of the shoe at an elevation equal to about a fifth of the effective shoe length to get very stable riding conditions.

The points of the head core gap are so placed on the shoe as to coincide with the part of the shoe nearest the drum periphery. The gap is situated as shown at the point of break in the lower shoe contour, i. e., where the curve ends and the shoe is flared straight. By means of the two head clamping screws it is made possible to adjust the angular and linear positions of the head and gap relative to the effective shoe surface.

Although the invention is illustrated as embodied in magnetic drum devices, it is apparent that there may be substituted for the drum other movable spherical, linear or reciprocating bodies, members or objects such as balls, disks, bands, wires, etc. It is also noteworthy that the control of the magnetic head could be applicable for other electrical effects such as electrostatic or thermo electric effects. In fact the head control is applicable to style, pointers, brushes, optical elements or any recording, sensing, indicating or erasing elements.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In a recording apparatus, a recording receiving member, means for moving said member to create a layer of fluid medium under pressure thereon, a recording element which is elongated to ride on said layer of fluid medium, means for supporting and loading said element to press it against said member and layer of fluid medium, and retracting means for withdrawing said element from said member and said layer during the time that said member moving means is starting and stopping, whereby said element is prevented from contacting said member while it is in motion at a rate of speed less than that sufficient to create said layer of fluid medium under pressure and sufficient to support the loaded element free from contact with said member.

2. In a recording apparatus, a record receiving member with some surface irregularity, a recording head cooperating with said member and having a substantial area near the surface of said member, a leaf spring with a divided free end for mounting said head flexibly near said member and movable in all directions with respect to the member surface while in operation to compensate for irregularities, and means for producing rapid relative motion between said head and said member to create a layer of air under pressure between said head and member and whereon said head is supported, whereby the head rides uniformly spaced above said member along all of its portions regardless of the surface irregularity as presented during said relative motion.

3. In a recording apparatus, an irregularly shaped record storage drum, a recording head cooperating with said drum and having a substantial curved surface cooperating with a portion of the periphery of said drum, means for mounting said head flexibly near said drum and movable in all three dimensions with respect to the periphery of the drum, and means for rotating said drum rapidly to create a layer of air under pressure between said head surface and the drum periphery and upon which the head rides, means for pivoting said head at a point ⅗ of its length along the periphery of the drum from the leading edge of said substantial cooperating surface, said pivoting point of said head being above the air supporting surface a distance equivalent to ⅕ of the length of said curve surface along the drum, whereby said head maintains during a recording operation a uniform spacing with respect to the drum periphery as supported by said air layer and regardless of the irregularity of the drum surface periphery.

4. In an apparatus for recording and sensing magnetic indicia, a drum bearing said indicia, means for rotating said drum, means for controlling the operation of said drum rotating means, a head for sensing and recording the indicia on said drum, an extending shoe on said head, said shoe being formed to curve around and fit over part of the periphery of said drum to float on the air stream thereof, a pair of trunnions extending from said head and shoe assembly, a bifurcated leaf spring with the divided end having two separate spaced bearings for receiving said trunnions, said spring at its solid end being fulcrumed on the apparatus at a tangent to the drum at the midpoint of the area of the shoe riding on the drum, means for adjustably flexing said spring to press down said shoe and head and load it to ride constantly a minute distance above said drum periphery despite its irregularity, a solenoid with connections for elevating said shoe and head above said drum, means for determining when the drum is rotating slower than operating speed, and means under control of said determining means and said drum controlling means for controlling said solenoid to elevate said shoe and head until the drum is rotating at operating speed.

5. In a supporting device, a drum, means for rotating said drum at about 4000 revolutions per minute, a shoe to be supported above said drum and having an area common to a portion of the periphery of said drum and space therefrom by a film of air generated as a skin effect on the rotating drum, means for flexibly holding said shoe in place, and means for loading said shoe in the direction of the drum at about 2 pounds per square inch of said shoe area, whereby the spacing of said shoe from the drum is maintained at about .001 of an inch or a fraction thereof.

6. In a magnetic recording and sensing device comprising a magnetic drum with some surface irregularities, means for rotating said drum, a recording and sensing head, an extension on said head shaped to conform with a portion of the periphery of said drum and to ride on an air film thereon created by rotation, said head and extension being of a low inertia characteristic and formed with side trunnions, and a flexible mounting means comprising a leaf spring with divided free ends encircling said side trunnions for said head and extension to keep them firmly pressed on said air film but free to float thereon and rock in all directions to maintain close and constant head to drum spacing while floating and rocking variably to conform with irregularities of the drum.

7. In a recording apparatus, the combination of a pair of bodies separated by a fluid medium, and means for moving a record receiving one of said bodies rapidly relative to the other recording body to create in said fluid medium a pressurized fluid medium film on said moving body upon which said other body rests relative to the moving body, whereby the resting body remains uniformly separated from the moving body for uniform recording spacing rgardless of the irregularity of the passing surface of the moving body, said combination comprising a holding means for said other body including a means for allowing rocking of said other body in one direction, a second means for allowing swinging of said other body in a second direction, and a third means for allowing tipping of said other body in a third direction.

8. In a recording apparatus, the combination of a pair of bodies separated by a fluid medium, and means for moving a record receiving one of said bodies rapidly relative to the other recording body to create in said fluid medium a pressurized fluid medium film on said moving body upon which said other body rests relative to the moving body, whereby the resting body remains uniformly separated from the moving body for uniform recording spacing regardless of the irregularity of the passing surface of the moving body, said combination including a retracing means controlled by said moving body and controlling over said other body to withdraw said other body from the position of rest relative to the moving body when said moving body is moving at a rate not sufficient to create a supporting film of the fluid medium.

9. In an apparatus for recording and sensing magnetic indicia, a drum for receiving said indicia, means for rotating said drum rapidly to create an air film thereon, a head for sensing and recording the indicia on said drum, means for supporting said head near said drum periphery, said head being formed with an extending shoe, said shoe being formed to curve around and fit over part of the periphery of said drum and to float on the air film thereon, means for retracting said head when said drum is in motion at a speed less than the speed sufficient for creation of an air film, a motor for said drum rotating means, a switch for said motor for calling it into and out of operation, a pair of contacts closed by said switch, a dashpot for holding said contacts closed momentarily, a solenoid with a circuit connected to said contacts, and a plunger in said solenoid, said plunger being connected to said head for retracting it whenever the contacts are closed.

References Cited in the file of this patent

UNITED STATES PATENTS

| | | |
|---|---|---|
| 2,612,566 | Anderson et al. | Sept. 30, 1952 |
| 2,673,249 | Ericsson | Mar. 23, 1954 |
| 2,685,492 | Gabriel | Aug. 3, 1954 |
| 2,772,135 | Hollabaugh | Nov. 27, 1956 |